(12) United States Patent
Rolland et al.

(10) Patent No.: US 11,207,835 B2
(45) Date of Patent: Dec. 28, 2021

(54) BONDED SURFACE COATING METHODS FOR ADDITIVELY MANUFACTURED PRODUCTS

(71) Applicant: Carbon, Inc., Redwood City, CA (US)

(72) Inventors: Jason P. Rolland, San Carlos, CA (US); Matthew S. Menyo, San Francisco, CA (US); Joseph M. Desimone, Monte Sereno, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/048,667

(22) PCT Filed: Apr. 10, 2019

(86) PCT No.: PCT/US2019/026767
§ 371 (c)(1),
(2) Date: Oct. 19, 2020

(87) PCT Pub. No.: WO2019/204095
PCT Pub. Date: Oct. 24, 2019

(65) Prior Publication Data
US 2021/0245425 A1    Aug. 12, 2021

Related U.S. Application Data

(60) Provisional application No. 62/660,527, filed on Apr. 20, 2018.

(51) Int. Cl.
*B29C 64/30* (2017.01)
*B29C 64/307* (2017.01)
*B29C 64/124* (2017.01)
*B29C 64/188* (2017.01)
*B29C 71/02* (2006.01)
*B29C 64/194* (2017.01)
*B33Y 10/00* (2015.01)
*B33Y 40/00* (2020.01)
*B33Y 70/00* (2020.01)

(52) U.S. Cl.
CPC ............ *B29C 64/30* (2017.08); *B29C 64/124* (2017.08); *B29C 64/188* (2017.08); *B29C 64/194* (2017.08); *B29C 64/307* (2017.08); *B29C 71/02* (2013.01); *B33Y 10/00* (2014.12); *B33Y 40/00* (2014.12); *B33Y 70/00* (2014.12)

(58) Field of Classification Search
CPC ..... B29C 64/188; B29C 64/194; B29C 64/30; B29C 71/02
See application file for complete search history.

(56) References Cited

U.S. PATENT DOCUMENTS

| 4,009,223 A | 2/1977 | Noonan |
| 4,276,212 A | 6/1981 | Khanna et al. |
| 4,785,075 A | 11/1988 | Shimp |
| 4,844,144 A * | 7/1989 | Murphy ............... B22C 9/04 164/35 |
| 4,892,474 A | 1/1990 | Gellert |
| 5,227,414 A | 7/1993 | Ernst et al. |
| 5,234,636 A | 8/1993 | Hull et al. |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 6,063,206 A | 5/2000 | Latta |
| 6,155,331 A * | 12/2000 | Langer ............... B22C 1/00 164/456 |
| 6,607,833 B1 | 8/2003 | Uhlianuk et al. |
| 6,989,421 B2 | 1/2006 | Grady |
| 7,037,958 B1 | 5/2006 | Hansen et al. |
| 7,183,248 B2 | 2/2007 | Manning |
| 7,438,846 B2 | 10/2008 | John |
| 8,110,135 B2 | 2/2012 | El-Siblani |

(Continued)

FOREIGN PATENT DOCUMENTS

| JP | 02111528 A * | 4/1990 | ........... B29C 64/135 |
| WO | 2015164234 A1 | 10/2015 | |

(Continued)

OTHER PUBLICATIONS

Dymax Corporation. May 19, 2017. "Light-Curable Coatings for 3D Printing", Retrieved from Youtube: https://www.youtube.com/watch?v-jmFfZ9zD6el.
Smooth-On. Nov. 18, 2014. "How to Add Color and Effects to a 3D Printed Part Using XTC-3D Coating". Retrieved from YouTube: https://www.youtube.com/watch?v=JaDVCq4QUH8.
Januszwiewicz, Rima , et al., "Layerless Fabrication with Continuous Liquid Interface Production", PNAS, 113(42), 2016, 11703-11708.
Poelma, Justin , et al., "Rethinking digital manufacturing with polymers", Science, 358(6369), 2017, 1384-1385.
Tumbleston, John R, et al., "Continuous liquid interface production of 3D Objects", Science, 347, Mar. 2015, 1349-1352.

(Continued)

*Primary Examiner* — Timothy Kennedy
(74) *Attorney, Agent, or Firm* — Myers Bigel, P.A.

(57) ABSTRACT

Provided is a method of making a cured object having a surface coating bonded thereto, which may include: providing an intermediate object produced in an additive manufacturing process such as stereolithography by light polymerization of a dual cure resin, the resin comprising a mixture of (i) a light polymerizable first component, and (ii) a second component that is different from the first component; applying a first reactive coating composition to a surface portion of the object to form a first coating thereon; optionally, but in some embodiments preferably, applying a second reactive coating composition to the first coating to form a second coating thereon; and heating the object at (and for) a time and to a temperature sufficient to bond the first coating to the surface portion, and bond the second coating when present to the first coating, and form the cured object having a surface coating bonded thereto.

18 Claims, No Drawings

(56) References Cited

U.S. PATENT DOCUMENTS

| | | |
|---|---|---|
| 8,227,544 B2 | 7/2012 | Trindade et al. |
| 8,512,802 B2 | 8/2013 | Dutt et al. |
| 8,568,888 B2 | 10/2013 | Choate |
| 8,765,108 B2 | 7/2014 | Lalleman |
| 9,023,782 B2 | 5/2015 | Peitersen et al. |
| 9,028,968 B2 | 5/2015 | Nixon et al. |
| 9,044,841 B2 | 6/2015 | Tian et al. |
| 9,068,152 B2 | 6/2015 | Klinkhammer et al. |
| 9,095,787 B2 | 8/2015 | Panandiker et al. |
| 9,120,997 B2 | 9/2015 | Sadlowski et al. |
| 9,121,000 B2 | 9/2015 | Burkinshaw et al. |
| 9,175,248 B2 | 11/2015 | Klinkhammer et al. |
| 9,198,847 B2 | 12/2015 | Peffly et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,533,328 B2 | 1/2017 | Kondo et al. |
| 9,598,606 B2 | 3/2017 | Rolland et al. |
| 9,676,963 B2 | 6/2017 | Rolland et al. |
| 9,688,875 B2 | 6/2017 | Chang |
| 9,745,806 B2 | 8/2017 | Jelgert et al. |
| 9,827,713 B1 * | 11/2017 | Linnell ................. B29C 64/393 |
| 9,884,982 B2 | 2/2018 | Sachse |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0028432 A1 * | 2/2017 | Miller ...................... C08J 7/046 |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0290374 A1 | 10/2018 | Willis et al. |

FOREIGN PATENT DOCUMENTS

| | | |
|---|---|---|
| WO | 2016133759 A1 | 8/2016 |
| WO | 2016145182 A1 | 9/2016 |
| WO | 2017134676 A1 | 8/2017 |

OTHER PUBLICATIONS

International Search Report and Written Opinion corresponding to PCT/US2019/026767; dated Jul. 17, 2019 (10 pages).

* cited by examiner

BONDED SURFACE COATING METHODS FOR ADDITIVELY MANUFACTURED PRODUCTS

CROSS REFERENCE TO RELATED APPLICATIONS

This application is a 35 U.S.C. § 371 national phase application of International Application Serial No. PCT/US2019/026767, filed Apr. 10, 2019, which claims priority to U.S. Provisional Application Ser. No. 62/660,527, filed Apr. 20, 2018, the entire contents of which are hereby incorporated by reference.

FIELD OF THE INVENTION

The present invention concerns additive manufacturing, and particularly concerns methods of making additively manufactured objects with coatings such as decorative coatings on surfaces thereof.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

The introduction of CLIP, the introduction of dual cure resins, and the recognition of the diverse variety of objects that can be conveniently produced thereby, has created a need for new techniques for bonding coatings to such objects.

SUMMARY OF THE INVENTION

A method of making a cured object having a surface coating bonded thereto may include the steps of:

providing an intermediate object produced in an additive manufacturing process such as stereolithography by light polymerization of a dual cure resin, the resin comprising a mixture of (i) a light polymerizable first component, and (ii) a second component that is different from the first component;

applying a first reactive coating composition to a surface portion of the object to form a first coating thereon (for example, a base coat, or in some embodiments abrasive particles);

optionally, but in some embodiments preferably, applying a second reactive coating composition to the first coating to form a second coating thereon (e.g., a clear coat); and heating the object at (and for) a time and to a temperature sufficient to bond (e.g., covalently bond) the first coating to the surface portion, and bond (e.g., covalently bond) the second coating when present to the first coating, and form the cured object having a surface coating bonded thereto.

In some embodiments, the intermediate object comprises a solid polymer scaffold formed by light polymerization of said light-polymerizable first component, and said heating is carried out under conditions in which said solid polymer scaffold degrades and forms a constituent necessary for the polymerization of said second component, to form said cured object.

In some embodiments, the cured object comprises a polymer blend, interpenetrating polymer network, semi-interpenetrating polymer network, or sequential interpenetrating polymer network formed from said first component and said second component.

An advantage of some embodiments of the present invention is that the coating compositions can contain ingredients that would be incompatible with, or at least partially disruptive of, the additive manufacturing process, as discussed further below.

Another advantage of some embodiments of the present invention is the creation of a strongly bonded surface coating to an object, such as flexible or elastic objects for which a strong and resilient bond between coating and substrate is important.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

1. Dual Cure Resins.

Dual cure resins for additive manufacturing are known and described in, for example, Rolland et al., U.S. Pat. Nos. 9,676,963; 9,598,606; and 9,453,142, the disclosures of which are incorporated herein by reference. Suitable examples include, but are not limited to, resins for producing parts comprised of polymers such as epoxy, cyanate ester, etc., that are formed from a heat polymerizable component, wherein the resin further comprises light-polymerizable components that photopolymerize during additive manufacturing to form a "green" or "intermediate" three-dimensional object.

As noted above, such resins typically include a mixture of (i) a light polymerizable first component, and (ii) a second component that is different from the first component.

In some embodiments, the light polymerizable first component comprises monomers, prepolymers, or both monomers and prepolymers that can be polymerized. by exposure to actinic radiation or light (e.g., the first component comprising reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers).

In some embodiments, said second component comprises: (a) the precursors to a polyurethane, polyurea, or copolymer thereof (e.g., the second solidifiable component comprising monomers, prepolymers, or both monomers and prepolymers comprising reactive end groups selected from the group consisting of isocyanate/hydroxyl, isocyanate/amine, or combinations thereof), or (b) an epoxy resin (e.g., the second solidifiable component comprising monomers, prepolymers, or both monomers and prepolymers comprising reactive end groups selected from the group consisting of epoxy/amine, epoxy/hydroxyl, etc., including combinations thereof).

2. Production of Intermediate Object.

Techniques for additive manufacturing of objects from dual cure resins as described above are known. Suitable techniques include bottom-up or top-down additive manufacturing, generally known as stereolithography. Such methods are described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419(Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017), the disclosures of which are incorporated by reference herein in their entirety.

3. Cleaning/Washing.

Where necessary or desired, green or intermediate objects as described above can be cleaned in any suitable manner, such as by wiping (with a rigid or flexible wiper, fabric, or compressed gas such as compressed air), washing, contacting to an absorbent material (e.g., absorbent pads or wipes, granular absorbent materials such as those comprised of diatomaceous earth and/or montmorillonite clay), or combinations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206.

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-pentafluoropropane, 1,1,1,3,3-pentafluorobutane, etc.

Examples of hydrochlorofluorocarbon solvents that may be used to carry out the present invention include, but are not limited to, 3,3-dichloro-1,1,1,2,2-pentafluoropropane, 1,3-dichloro-1,1,2,2,3-pentfluoropropane, 1,1-dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec™ 7100 (3M), Novec™ 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

Depending on factors such as the combination of techniques chosen for the cleaning step, the duration and temperature of contact of the object to any wash liquid that may be used, and the like, more mild wash liquids may be preferred to avoid unduly depleting the green object of polymerizable constituents that might otherwise advantageously sweat out from the object. For example, wash liquids comprised of isopropanol may be diluted with propylene glycol (e.g., up to 30, 40, 50, or 60 percent by weight) to provide a less aggressive wash liquid, or the wash liquid may be comprised entirely or almost entirely of propylene glycol (e.g., at least 70, 80 or 90 percent by weight). Of course, where wash liquids are not used (for example, where the cleaning step is carried out entirely by wiping, blowing, contacting to an absorbent material, etc.), aggressiveness of wash liquid is not a concern.

When the cleaning step imparts ingredients to the surface of the object that are not desired for carrying into the coating and/or further curing step (such as from a particulate absorbent and/or a wash liquid), in some embodiments the cleaning step can be followed with a further rinsing step (e.g., with distilled and/or deionized water), wiping step, and/or blowing step.

4. Surface Coating.

As noted above, from an intermediate object producted as described above, the method further includes: applying a first reactive coating composition to a surface portion of the object to form a first coating thereon (for example, a base coat, or in some embodiments abrasive particles); and optionally, but in some embodiments preferably, applying a second reactive coating composition to the first coating to form a second coating thereon (e.g., a clear coat). Additional reactive coating steps, such as a primer coat before the first reactive coating, can optionally be included, and flash-drying steps between coatings can optionally be included in accordance with known techniques or variations thereof that will be apparent to those skilled in the art.

A. Polymerizable resin coating compositions. Numerous polymerizable resin coating compositions are known, and specific formulations thereof, and constituent ingredients thereof, will be apparent to those skilled in the art. Examples are given in Bayer, *The Chemistry of Polyurethane Coatings* (2005); HRSD Coatings Manual (2005) (Appendix C: *Basics on Coatings Chemistry: What the Generic Types Mean Practically*); Huntsman *Epoxy Resin and Hardener Selector Guide* (2012); and see generally A. Goldschmidt and H. J. Streitberger, *BASF Handbook on Basics of Coating Technology* (2d Ed. 2007).

Specific examples of coating compositions useful for carrying out the present invention are those where the first coating material, and the second coating material when present, each independently comprises:

(a) a combination of (i) optionally blocked diisocyanates and/or polyisocyanates (ii) polyols, polyamines, or a combination thereof (e.g., acrylic hydroxyl functional components);

(b) a combination of (i) a melamine or melamine silane resin and (ii) polyols, polyamines, or a combination thereof (e.g., acrylic hydroxyl functional components);

(c) a combination of (i) a melamine resin, (ii) optionally blocked diisocyanates and/or polyisocyanates, and (iii) polyols, polyamines, or a combination thereof (e.g. acrylic hydroxyl functional components); or (d) a combination of (i) an epoxy resin (e.g., a polyepoxide) and (ii) an epoxy hardener (e.g., a polyamine, polyol, polythiol, polyanhydride, carboxylic acid, or combination thereof).

Examples of suitable coating compositions, and constituent ingredients thereof, for carrying out the present invention include but are not limited to those described in M. Grady, U.S. Pat. No. 6,989,421 (describing coating compositions containing melamines such as Cymel® 301, 350, 325, 327, 370, 1130, 1133, or Resimene BMP5503); W. Dutt et al., U.S. Pat. No. 8,512,802 (describing melamine carbamate aqueous aliphatic polyurethane dispersions for base coat/clear coat finishes); R. T. Khanna, U.S. Pat. No. 4,276,212 (describing high solids coating compositions containing hydroxyl-functional polyols useful as automotive, airplane, and appliance finishes); P. Uhlianuk et al., U.S. Pat. No. 6,607,833 (describing clear coating composition comprising isocyanate, silane and melamine components).

Additional non-limiting examples of suitable coating compositions and constituent ingredients thereof include, but are not limited to, those described in U.S. Pat. Nos. 9,688,875; 9,533,328; 9,028,968; 8,568,888; 8,227,544; 7,037,958; 6,607,833; 5,227,414; and 4,009,223.

Polymerizable resin coating compositions for use as described herein can contain a variety of additional ingredients, examples of which include, but are not limited to, those where:

(a) the first reactive coating composition further comprises dyes and/or pigments (e.g., in an amount of from 2, 5 or 10 percent by weight of solids to 40 or 50 percent by weight of solids, or more);

(b) the first reactive coating composition further comprises metallic flakes, pearlescent particles, or a combination thereof (e.g., in an amount of from 2, 5, or 10 percent by weight of solids to 40 or 50 percent by weight of solids);

(c) the first reactive coating composition, and/or the second reactive coating composition when present, further comprises a scratch-resistance additive (e.g. silica particles) (e.g., in an amount of from 2, 5, or 10 percent by weight of solids to 40 or 50 percent by weight of solids, or more); and/or (d) the first reactive coating composition, and/or the second reactive coating composition when present, further comprises an ultraviolet light absorber, a hindered-amine light stabilizer, or a combination thereof (e.g., in an amount of from 2, 5, or 10 percent by weight of solids to 40 or 50 percent by weight of solids, or more).

As will be seen above, percent by weight given herein are by weight of solids, as the coating compositions may, in some embodiments, further comprise an aqueous carrier, organic carrier or combination thereof (the amount of which will depend on factors such as the coating technique), or in other embodiments may be applied in dry powder form (e.g., by electrostatic spray).

Coatings may be applied by any suitable technique, including brushing, dipping, spraying, etc. Coatings may be applied in one layer or multiple layers as is known in the art, optionally with drying or partial drying between coats.

B. Abrasive coatings. In some embodiments, particularly for making cutting and grinding tools, the first reactive coating composition comprises abrasive particles. Numerous types of abrasive particles are known, some of which intrinsically include surface reactive groups, and others of which can be surface modified to include surface reactive functional groups thereon (e.g., amine, carboxylic acid, epoxy, or hydroxy groups, or combinations thereof). Non-limiting examples of abrasive particles include, but are not limited to, those described in U.S. Pat. Nos. 9,884,982; 9,745,806; and 9,044,841, the disclosures of which are incorporated herein by reference. Particular examples of suitable abrasive particles include, but are not limited to, those comprised of a nitride such as cubic boron nitride, an oxide such as aluminum oxide, a carbide such as silicon carbide and/or tungsten carbide, a boride, a silicate, amine-functionalized silica (sand) or garnet particles, zirconic mullit, silicon, zircon, tungsten, carborundum, glass, a ceramic, corundum, quartz, titanium, diamond, or a combination of two or more thereof.

5. Further Curing/Baking.

The object may be heated after coating, or in some embodiments before coating, for example, when the coating composition is in dry powder form, such as by heating the object, then by spraying the heated object with a dry powder, or by contacting the heated object to a fluidized bed of the dry powder. Thus the object is heated at a time (and for a time), and to a temperature, sufficient to bond (e.g., covalently bond) the first coating to the surface portion, and bond (e.g., covalently bond) the second coating when present to the first coating, and form the cured object having a surface coating bonded thereto.

Heating may be active heating (e.g., in an oven, such as an electric, gas, solar oven or microwave oven, heated bath, or combination thereof), or passive heating (e.g., at ambient (room) temperature). Active heating will generally be more rapid, and conducive to sweating, than passive heating and is typically preferred, but passive heating—such as simply maintaining the intermediate at ambient temperature for a sufficient time to effect further cure—may in some embodiments be employed.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. See, e.g., U.S. Pat. No. 4,785,075.

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA; Davron Technologies, 4563 Pinnacle Lane, Chattanooga, Tenn. 37415 USA; Despatch Thermal Processing Technology, 8860 207th Street, Minneapolis, Minn. 55044 USA; and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof. See, e.g., U.S. Pat. No. 5,506,007.

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

In some embodiments, the heating step is preferably carried out over a time of at least 1, 2, 3 or 4 hours or more (to enhance sweating), and/or on a "ramped" schedule of gradually increasing temperatures, or over two or more stages (e.g., to a first elevated temperature at which sweating is achieved, and then a second temperature, higher than the first elevated temperature, at which the heat polymerization of the sweated constituents is enhanced). Particular heat schedules can be optimized based on factors such as specific resin type and ingredients, the size and shape of the objects being heated, coating thickness and composition, and the like.

Depending on the particular choice of polymerizable resin and coating(s) and their constituent ingredients, the optimization of which is within the skill in the art, numerous types of objects can be produced, including those where:

(i) the cured object is rigid, the first coating is rigid, flexible, or elastic, and the second coating when present is rigid, flexible, or elastic;

(ii) the cured object is flexible, the first coating is flexible or elastic, and the second coating when present is flexible or elastic; or (iii) the cured object is elastic, the first coating is elastic, and the second coating when present is elastic.

Particular examples of objects that can be produced by the methods described herein include, but are not limited to, decorative or functional/decorative objects such as automotive, airplane, or appliance interior or exterior trim components (e.g., bumper covers) and grinding or cutting tools (e.g., when the coating is an abrasive material).

The foregoing is illustrative of the present invention, and is not to be construed as limiting thereof. The invention is defined by the following claims, with equivalents of the claims to be included therein.

We claim:

1. A method of making a cured object having a surface coating bonded thereto, comprising:
providing an intermediate object produced in an additive manufacturing process by light polymerization of a dual cure resin, said resin comprising a mixture of (i) a light polymerizable first component, and (ii) a second component that is different from said first component;
applying a first reactive coating composition to a surface portion of said intermediate object to form a first coating thereon, wherein said first reactive coating composition comprises abrasive particles;
optionally applying a second reactive coating composition to said first coating to form a second coating thereon; and
heating said intermediate object at a time and temperature sufficient to bond said first coating to said surface portion, and bond said second coating when present to said first coating, and form the cured object having a surface coating bonded thereto.

2. The method of claim 1, wherein said first reactive coating composition comprises a polymerizable resin.

3. The method of claim 1, wherein:
(a) said first reactive coating composition further comprises dyes and/or pigments;
(b) said first reactive coating composition further comprises metallic flakes, pearlescent particles, or a combination thereof;
(c) said first reactive coating composition and/or said second reactive coating composition when present further comprises a scratch-resistance additive; and/or
(d) said first reactive coating composition, and/or said second reactive coating composition when present, further comprises an ultraviolet light absorber, a hindered-amine light stabilizer, or a combination thereof.

4. The method of claim 1, wherein said first reactive coating composition, and said second reactive coating composition when present, each independently:
(a) further comprises an aqueous carrier, organic carrier or combination thereof; or
(b) is applied in dry powder form.

5. The method of claim 1, wherein said first reactive coating composition, and said second reactive coating composition when present, each independently comprises:
(a) a combination of (i) optionally blocked diisocyanates and/or polyisocyanates (ii) polyols, polyamines, or a combination thereof;
(b) a combination of (i) a melamine or melamine silane resin and (ii) polyols, polyamines, or a combination thereof;
(c) a combination of (i) a melamine resin, (ii) optionally blocked diisocyanates and/or polyisocyanates, and (iii) polyols, polyamines, or a combination thereof; or
(d) a combination of (i) an epoxy resin and (ii) an epoxy hardener.

6. The method of claim 1, wherein said light polymerizable first component of said dual cure resin comprises monomers, prepolymers, or both monomers and prepolymers that can be polymerized by exposure to actinic radiation or light.

7. The method of claim 1, wherein said second component of said dual cure resin comprises:
(a) the precursors to a polyurethane, polyurea, or copolymer thereof, or
(b) an epoxy resin.

8. The method of claim 1, wherein said intermediate object comprises a solid polymer scaffold formed by light polymerization of said light polymerizable first component, and said heating is carried out under conditions in which said solid polymer scaffold degrades and forms a constituent necessary for the polymerization of said second component, to form said cured object.

9. The method of claim 1, wherein said cured object comprises a polymer blend, interpenetrating polymer network, semi-interpenetrating polymer network, or sequential interpenetrating polymer network formed from said first component and said second component.

10. The method of claim 1, wherein:
(i) said cured object is rigid, said first coating when cured is rigid, flexible, or elastic, and said second coating when present and when cured is rigid, flexible, or elastic;
(ii) said cured object is flexible, said first coating when cured is flexible or elastic, and said second coating when present and when cured is flexible or elastic; or
(iii) said cured object is elastic, said first coating when cured is elastic, and said second coating when present and when cured is elastic.

11. The method of claim 1, wherein said abrasive particles comprise a nitride such as cubic boron nitride, an oxide such as aluminum oxide, a carbide such as silicon carbide and/or tungsten carbide, a boride, a silicate, amine-functionalized silica (sand) or garnet particles, zirconic mullit, silicon, zircon, tungsten, carborundum, glass, a ceramic, corundum, quartz, titanium, diamond, or a combination of two or more thereof.

12. The method of claim 1, wherein said intermediate object is produced by bottom-up or top-down stereolithography.

13. The method of claim 1, wherein said abrasive particles of said first reactive coating composition are intrinsically surface reactive particles or particles modified to include surface reactive functional groups selected from the group consisting of amine, carboxylic acid, epoxy, and hydroxy groups.

14. The method of claim 3, wherein:
(a) said dyes and/or pigments are present in an amount of from 2 to 50 percent by weight of solids;
(b) said metallic flakes, pearlescent particles, or combination thereof are present in an amount of 2 to 50 percent by weight of solids;
(c) said scratch-resistance additive is present in an amount of 2 to 50 percent by weight of solids; and/or
(d) said ultraviolet light absorber, hindered-amine light stabilizer, or combination thereof is present in an amount of 2 to 50 percent by weight of solids.

15. The method of claim 1, wherein applying said first reactive coating composition is carried out by electrostatic spray.

16. The method of claim 5, wherein said first reactive coating composition, and said second reactive coating composition when present, each independently comprises the combination of the epoxy resin and the epoxy hardener, wherein the epoxy resin is a polyepoxide and the epoxy hardener is a polyamine, polyol, polythiol, polyanhydride, carboxylic acid, or combination of two or more thereof.

17. The method of claim 1, wherein said first component comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

18. The method of claim 1, wherein said second component of said dual cure resin comprises:

(a) reactive end groups selected from the group consisting of isocyanate/hydroxyl, isocyanate/amine, or a combination thereof, or
(b) reactive end groups selected from the group consisting of epoxy/amine, epoxy/hydroxyl, or a combination thereof.

\* \* \* \* \*